US012404805B2

(12) United States Patent
Okuyama et al.

(10) Patent No.: US 12,404,805 B2
(45) Date of Patent: Sep. 2, 2025

(54) COMBINED CYCLE POWER GENERATION FACILITY

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Tomomi Okuyama, Ota (JP); Hideaki Shimada, Yokohama (JP); Masao Itoh, Yokohama (JP); Yuichi Morisawa, Yokohama (JP); Hiroki Kasuya, Yokohama (JP); Ryu Hirayama, Yokohama (JP); Kojiro Tada, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 19/005,225

(22) Filed: Dec. 30, 2024

(65) Prior Publication Data

US 2025/0129742 A1 Apr. 24, 2025

Related U.S. Application Data

(63) Continuation of application No. PCT/JP2023/026215, filed on Jul. 18, 2023.

(30) Foreign Application Priority Data

Aug. 18, 2022 (JP) ................................. 2022-130462

(51) Int. Cl.
*F02C 6/18* (2006.01)
*F01K 23/10* (2006.01)

(52) U.S. Cl.
CPC ................ *F02C 6/18* (2013.01); *F01K 23/10* (2013.01)

(58) Field of Classification Search
CPC .......... F02C 6/18; F01K 23/10; F01K 23/106; F01K 7/16; F22B 1/1815
See application file for complete search history.

(56) References Cited

U.S. PATENT DOCUMENTS 5,058,373 A * 10/1991 Moore .................... F01D 13/00
60/39.27
5,755,089 A 5/1998 Vanselow
(Continued)

FOREIGN PATENT DOCUMENTS

EP 4455460 A1 * 10/2024 ............ F01K 13/02
JP 9-144559 A 6/1997
(Continued)

OTHER PUBLICATIONS

International Search Report issued Sep. 19, 2023 in PCT/JP2023/026215 filed Jul. 18, 2023, 2 pages.

*Primary Examiner* — William H Rodriguez
(74) *Attorney, Agent, or Firm* — Oblon, McClelland, Maier & Neustadt, L.L.P.

(57) ABSTRACT

A combined cycle power generation facility of an embodiment includes a first heat recovery steam generator including a high-pressure steam generation part using an exhaust gas of a gas turbine and a reheat part; a high-pressure turbine to which steam is introduced from the high-pressure steam generation part; a combustor which combusts hydrogen and oxygen; a reheat steam pipe connecting the high-pressure turbine and the combustor with the reheat part interposed therebetween; an oxygen-hydrogen combustion turbine to which steam is introduced from the combustor; a second heat recovery steam generator including a steam generation part using an exhaust gas of the oxygen-hydrogen combus- (Continued)

tion turbine; a low-pressure turbine to which steam is introduced from the steam generation part; and a condenser which steam is introduced from the low-pressure turbine.

6 Claims, 2 Drawing Sheets

(56) References Cited

U.S. PATENT DOCUMENTS

| | | | |
|---|---|---|---|
| 5,953,900 A | 9/1999 | Bannister et al. | |
| 6,038,851 A * | 3/2000 | Shiba | F02C 6/18 60/39.182 |
| 6,205,762 B1 * | 3/2001 | Uematsu | F01K 23/10 60/39.182 |
| 6,220,013 B1 * | 4/2001 | Smith | F01K 23/106 110/212 |
| 6,405,537 B1 * | 6/2002 | Wada | F01K 23/16 60/39.182 |
| 6,438,939 B1 * | 8/2002 | Uematsu | F02C 7/18 60/39.182 |
| 7,316,105 B2 | 1/2008 | Haberberger et al. | |
| 11,274,575 B2 * | 3/2022 | Uechi | F01K 25/10 |
| 11,326,465 B2 * | 5/2022 | Fujimura | F01K 23/108 |
| 11,608,758 B2 | 3/2023 | Tanimura et al. | |
| 11,834,968 B2 | 12/2023 | Uechi et al. | |
| 2004/0128975 A1 | 7/2004 | Viteri | |
| 2007/0012025 A1 * | 1/2007 | Kreitmeier | F02C 3/205 60/39.182 |
| 2011/0127773 A1 * | 6/2011 | Freund | F22B 1/006 60/39.182 |
| 2011/0140453 A1 * | 6/2011 | Shortlidge | F01K 7/40 290/1 A |
| 2017/0152762 A1 * | 6/2017 | Murakami | F01K 11/02 |
| 2020/0332681 A1 * | 10/2020 | Uechi | F01K 7/32 |

FOREIGN PATENT DOCUMENTS

| | | |
|---|---|---|
| JP | 9-510276 A | 10/1997 |
| JP | 3068529 B2 | 7/2000 |
| JP | 2003-106108 A | 4/2003 |
| JP | 2006-514718 A | 5/2006 |
| JP | 2018-123811 A | 8/2018 |
| JP | 2021-85608 A | 6/2021 |
| WO | WO-2024038724 A1 * | 2/2024 |

* cited by examiner

COMBINED CYCLE POWER GENERATION FACILITY

CROSS REFERENCE TO RELATED APPLICATIONS

This application is based upon and claims the benefit of priority from Japanese Patent Application No. 2022-130462, filed on Aug. 18, 2022; the entire contents of which are incorporated herein by reference.

FIELD

Embodiments of the present invention relate to a combined cycle power generation facility.

BACKGROUND

In a thermal power plant in recent years, a demand for a combined cycle power generation facility to yield high thermal efficiency is increasing. A conventional combined cycle power generation facility includes a gas turbine, a heat recovery steam generator, a steam turbine, and a generator. In this combined cycle power generation facility, an exhaust gas at high temperatures from the gas turbine is introduced to the heat recovery steam generator. Steam generated in the heat recovery steam generator is introduced to the steam turbine.

In the heat recovery steam generator of the conventional combined cycle power generation facility, a temperature of the generated steam is lower than a temperature of the exhaust gas of the gas turbine. Further, there is a limit to further increasing a temperature of the steam to be introduced to the steam turbine under a condition where the temperature of the exhaust gas of the conventional gas turbine is maintained. Therefore, the thermal efficiency of the cycle is difficult to further improve under the condition where the temperature of the exhaust gas of the conventional gas turbine is maintained.

DETAILED DESCRIPTION

Hereinafter, embodiments of the present invention will be explained with reference to the drawings.

In one embodiment, a combined cycle power generation facility of an embodiment includes: a gas turbine; a first heat recovery steam generator including a first steam generation part which uses a heat quantity of an exhaust gas from the gas turbine to generate steam, and a reheat part which reheats steam; and a first steam turbine to which the steam generated by the first steam generation part is introduced.

Further, the combined cycle power generation facility includes: a combustor which combusts hydrogen and oxygen; a reheat steam pipe connecting a steam outlet of the first steam turbine and the combustor with the reheat part interposed therebetween; a second steam turbine which is coupled to the combustor and to which steam discharged from the combustor is introduced; a second heat recovery steam generator including a second steam generation part which uses a heat quantity of steam discharged from the second steam turbine to generate steam; a third steam turbine to which the steam generated by the second steam generation part is introduced; and a condenser which changes steam discharged from the third steam turbine into condensed water.

Figure 1:
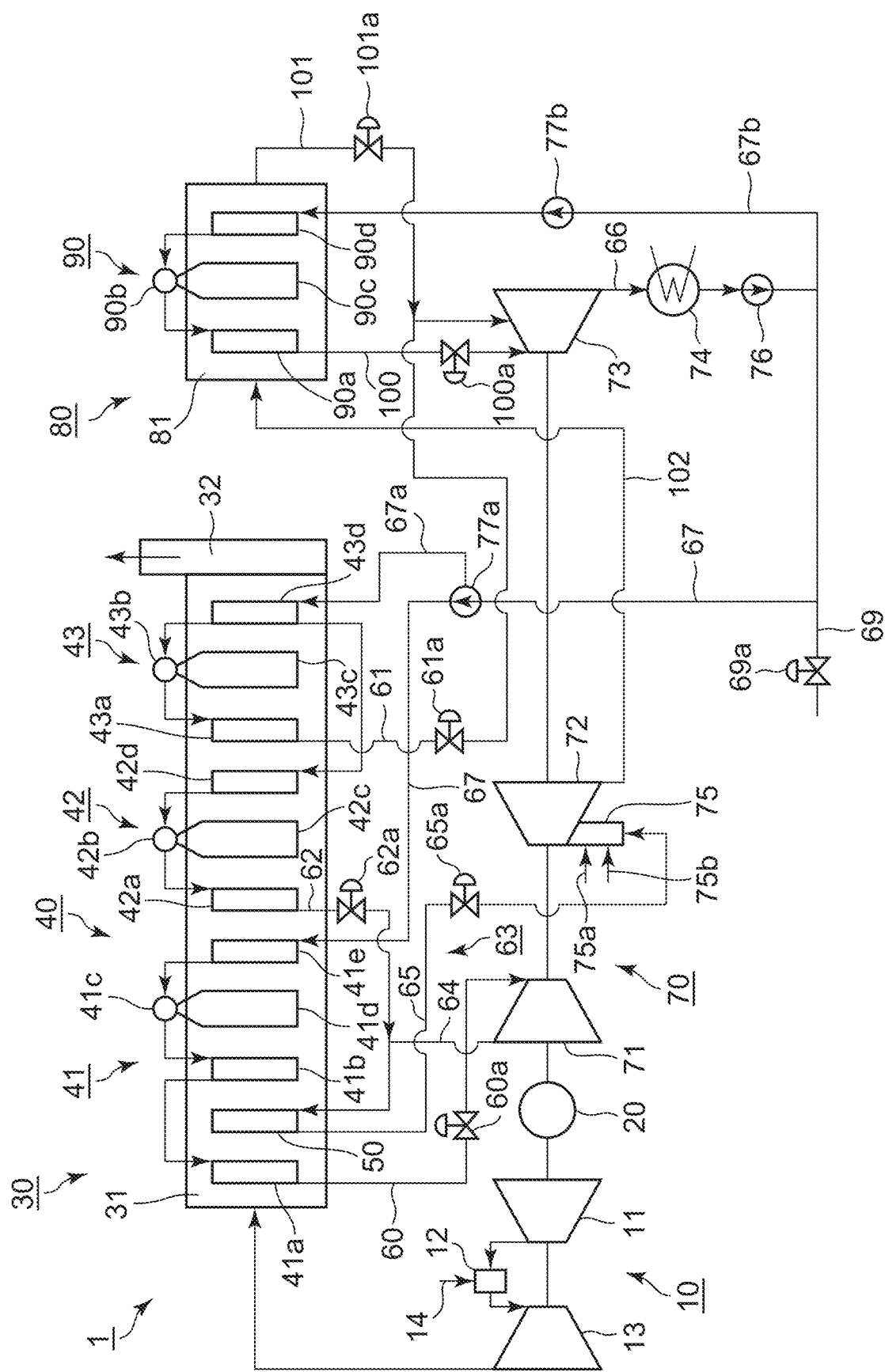
FIG. 1 is a system diagram schematically illustrating a configuration of a combined cycle power generation facility of an embodiment.

FIG. 1 is a system diagram schematically illustrating a configuration of a combined cycle power generation facility 1 of the embodiment. As illustrated in FIG. 1, the combined cycle power generation facility 1 includes a gas turbine 10, a steam turbine system 70, and a generator 20 as main constituent apparatuses.

The gas turbine 10 includes a compressor 11, a combustor 12, and a turbine 13. The generator 20 is disposed on the same axis as the compressor 11 and the turbine 13. The respective rotors of the compressor 11, the turbine 13, and the generator 20 are configured to integrally rotate.

The compressor 11 sucks and compresses air to supply it to the combustor 12, for example. A fuel supply part 14 supplies fuel to the combustor 12. In the combustor 12, the fuel and the compressed air are combusted, and a combustion gas is produced.

Note that an example of using the compressed air as an oxidant is indicated here, but the oxidant is not limited to air. As the oxidant, for example, oxygen may be used. The fuel is not particularly limited. As the fuel, for example, hydrocarbon such as methane or natural gas, hydrogen, ammonia, a composite fuel of hydrocarbon and hydrogen, a composite fuel of hydrocarbon and ammonia, or the like may be used. Further, as the fuel, for example, a coal gasification gas fuel containing carbon monoxide, hydrogen, and the like, or a coal gasification gas fuel containing ammonia may be used.

The combustion gas produced by the combustor 12 is supplied to the turbine 13 to rotationally move the turbine 13. The generator 20 and the compressor 11 are driven by rotationally moving the turbine 13. The combustion gas discharged from the turbine 13 is guided to a first heat recovery steam generator 30 as an exhaust gas.

The steam turbine system 70 includes the first heat recovery steam generator (HRSG) 30, a plurality of steam turbines, a combustor 75, a second heat recovery steam generator (HRSG) 80, and a condenser 74. Further, the steam turbine system 70 includes a condensed water supply system and a condensed water discharge system.

The first heat recovery steam generator 30 includes a flow path 31 to which the exhaust gas from the gas turbine 10 is introduced, a steam generation part 40 and a reheat part 50 provided in the flow path 31, and a smokestack 32 which discharges the exhaust gas passed through the steam generation part 40 to the outside. The steam generation part 40 uses a heat quantity which the exhaust gas has to generate steam. The reheat part 50 uses the heat quantity which the exhaust gas has to reheat steam.

The steam generation part 40 includes, for example, a high-pressure steam generation part 41, an intermediate-pressure steam generation part 42, and a low-pressure steam generation part 43. Further, these steam generation parts are disposed in order of the high-pressure steam generation part 41, the intermediate-pressure steam generation part 42, and the low-pressure steam generation part 43 from a side to which the exhaust gas is introduced.

The high-pressure steam generation part 41 includes a first high-pressure superheater 41a, a second high-pressure superheater 41b, a high-pressure steam drum 41c, a high-pressure evaporator 41d, and a high-pressure economizer 41e. The high-pressure steam drum 41c is connected to the high-pressure evaporator 41d. The high-pressure economizer 41e is coupled to a feed pipe 67 which guides feedwater from the condenser 74. Note that here, an example of including the two high-pressure superheaters is indicated, but a configuration to include one high-pressure superheater is applicable.

Water heated by the high-pressure economizer 41e is introduced to the high-pressure steam drum 41c, and is changed into steam by the high-pressure evaporator 41d. The steam generated by the high-pressure evaporator 41d is guided to the second high-pressure superheater 41b and the first high-pressure superheater 41a to be superheated. The superheated steam is guided to a high-pressure turbine 71 via a main steam pipe 60.

The intermediate-pressure steam generation part 42 includes an intermediate-pressure superheater 42a, an intermediate-pressure steam drum 42b, an intermediate-pressure evaporator 42c, and an intermediate-pressure economizer 42d. The intermediate-pressure steam drum 42b is connected to the intermediate-pressure evaporator 42c. The intermediate-pressure economizer 42d is coupled to, for example, a low-pressure economizer 43d.

Water supplied from the low-pressure economizer 43d is heated in the intermediate-pressure economizer 42d. The water heated by the intermediate-pressure economizer 42d is introduced to the intermediate-pressure steam drum 42b, and changed into steam by the intermediate-pressure evaporator 42c. The steam generated by the intermediate-pressure evaporator 42c is guided to the intermediate-pressure superheater 42a to be superheated. The superheated steam is guided to a low-temperature reheat steam pipe 64 to be described later via a steam pipe 62. A steam valve 62a which regulates a flow rate of the steam to be introduced to the low-temperature reheat steam pipe 64 is interposed in the steam pipe 62.

The low-pressure steam generation part 43 includes a low-pressure superheater 43a, a low-pressure steam drum 43b, a low-pressure evaporator 43c, and a low-pressure economizer 43d. Note that the low-pressure steam generation part 43 functions as a third steam generation part. The low-pressure steam drum 43b is connected to the low-pressure evaporator 43c. The low-pressure economizer 43d is coupled to a feed pipe 67a which guides the feedwater from the condenser 74.

Water heated by the low-pressure economizer 43d is introduced to the low-pressure steam drum 43b, and changed into steam by the low-pressure evaporator 43c. Note that a part of the water heated by the low-pressure economizer 43d is introduced to the intermediate-pressure economizer 42d. The steam generated by the low-pressure evaporator 43c is guided to the low-pressure superheater 43a to be superheated. The superheated steam is guided to a predetermined turbine stage of the low-pressure turbine 73 via a steam supply pipe 61. Note that a steam valve 61a which regulates a flow rate of the steam to be introduced to the low-pressure turbine 73 is interposed in the steam supply pipe 61.

The steam is introduced to, for example, a turbine stage on a further downstream side than a turbine stage in an initial stage via the steam supply pipe 61. Thus, a turbine output is increased by introducing the steam to a predetermined turbine stage.

The reheat part 50 is disposed between the first high-pressure superheater 41a and the second high-pressure superheater 41b, for example. A steam inlet of the reheat part 50 is coupled to the low-temperature reheat steam pipe 64, and a steam outlet of the reheat part 50 is coupled to a high-temperature reheat steam pipe 65.

The plurality of steam turbines include the high-pressure turbine 71, an oxygen-hydrogen combustion turbine 72, and the low-pressure turbine 73. Note that the high-pressure turbine 71 functions as a first steam turbine, the oxygen-hydrogen combustion turbine 72 functions as a second steam turbine, and the low-pressure turbine 73 functions as a third steam turbine.

In a configuration illustrated in FIG. 1, the compressor 11, the turbine 13, the generator 20, the high-pressure turbine 71, the oxygen-hydrogen combustion turbine 72, and the low-pressure turbine 73 are disposed on the same axis, and their respective rotors are configured to integrally rotate. Note that, for example, the gas turbine 10 and the steam turbines 71, 72, 73 may be coupled to their respective separate generators.

A steam inlet of the high-pressure turbine 71 is coupled to the first high-pressure superheater 41a via the main steam pipe 60. A steam valve 60a which regulates a flow rate of the steam to be introduced to the high-pressure turbine 71 is interposed in the main steam pipe 60.

A steam outlet of the high-pressure turbine 71 is coupled to a combustor 75 via a reheat steam pipe 63 in which the reheat part 50 is interposed. The reheat steam pipe 63 includes the low-temperature reheat steam pipe 64 connected between the steam outlet of the high-pressure turbine 71 and the reheat part 50, and the high-temperature reheat steam pipe 65 connected between the reheat part 50 and the combustor 75. For example, a steam valve 65a which regulates a flow rate of steam to be introduced to the combustor 75 is interposed in the high-temperature reheat steam pipe 65.

The combustor 75 combusts the fuel and the oxidant. The combustor 75 is provided at, for example, a steam inlet portion of the oxygen-hydrogen combustion turbine 72. The combustor 75 includes a fuel supply part 75a which supplies the fuel and an oxidant supply part 75b which supplies the oxidant. The fuel supplied to the combustor 75 is hydrogen ($H_2$). Further, the oxidant supplied to the combustor 75 is oxygen ($O_2$). Therefore, in the combustor 75, water vapor is produced as a combustion gas.

The water vapor produced by the combustor 75 is mixed with the steam introduced to the combustor 75 via the high-temperature reheat steam pipe 65, and introduced to the oxygen-hydrogen combustion turbine 72. That is, steam in which the steam reheated by the reheat part 50 and the water vapor produced by the combustor 75 are mixed is introduced to the oxygen-hydrogen combustion turbine 72.

A steam outlet of the oxygen-hydrogen combustion turbine 72 is coupled to a second heat recovery steam generator 80 via a steam pipe 102. That is, the steam pipe 102 connects the steam outlet of the oxygen-hydrogen combustion turbine 72 and a steam inlet of the second heat recovery steam generator 80.

A steam inlet of the low-pressure turbine 73 is coupled to a superheater 90a of the second heat recovery steam generator 80 via a steam pipe 100. A steam valve 100a which regulates a flow rate of steam to be introduced to the low-pressure turbine 73 is interposed in the steam pipe 100. A steam outlet of the low-pressure turbine 73 is coupled to the condenser 74 via an exhaust pipe 66.

The second heat recovery steam generator 80 includes a flow path 81 to which an exhaust gas from the oxygen-hydrogen combustion turbine 72 is introduced, and a steam generation part 90 provided in the flow path 81. The steam generation part 90 uses a heat quantity of steam discharged from the oxygen-hydrogen combustion turbine 72 to generate steam. Note that the steam generation part 90 functions as a second steam generation part.

The steam generation part 90 includes the superheater 90a, a steam drum 90b, an evaporator 90c, and an economizer 90d. The steam drum 90b is connected to the evaporator 90c. The economizer 90d is coupled to a feed pipe 67b which guides the feedwater from the condenser 74. A steam outlet of the second heat recovery steam generator 80 is coupled to a steam supply pipe 61 via a steam pipe 101. Note that a steam valve 101a which regulates a flow rate of steam to be introduced to the steam supply pipe 61 is interposed in the steam pipe 101.

Water heated by the economizer 90d is introduced to the steam drum 90b, and changed into steam by the evaporator 90c. The steam generated by the evaporator 90c is guided to the superheater 90a to be superheated. The superheated steam is guided to the low-pressure turbine 73 via the steam pipe 100.

The steam discharged from the second heat recovery steam generator 80 is introduced to the steam supply pipe 61 via the steam pipe 101. The steam introduced to the steam supply pipe 61 is guided to a predetermined turbine stage of the low-pressure turbine 73 with the steam discharged from the low-pressure superheater 43a.

The condensed water supply system supplies condensed water produced by the condenser 74 to the first heat recovery steam generator 30 and the second heat recovery steam generator 80. The condensed water supply system includes the feed pipes 67, 67a, 67b, a low-pressure feed pump 76, and high-pressure feed pumps 77a, 77b.

One end of the feed pipe 67 is coupled to the condenser 74, and the other end of the feed pipe 67 is coupled to the high-pressure economizer 41e. The low-pressure feed pump 76 and the high-pressure feed pump 77a are interposed in the feed pipe 67.

One end of the feed pipe 67a is coupled to a middle stage of the high-pressure feed pump 77a. The other end of the feed pipe 67a is coupled to the low-pressure economizer 43d.

One end of the feed pipe 67b is coupled to the feed pipe 67 between the low-pressure feed pump 76 and the high-pressure feed pump 77a. The other end of the feed pipe 67b is coupled to the economizer 90d. The high-pressure feed pump 77b is interposed in the feed pipe 67b.

The condensed water produced by the condenser 74 is pumped to the high-pressure economizer 41e and the low-pressure economizer 43d by the low-pressure feed pump 76 and the high-pressure feed pump 77a. Further, the condensed water produced by the condenser 74 is pumped to the economizer 90d by the low-pressure feed pump 76 and the high-pressure feed pump 77b.

The condensed water discharge system removes a water quantity equal to the water quantity resulting from condensation of the water vapor produced by the combustor 75 from the condensed water produced by the condenser 74. The condensed water discharge system includes a discharge pipe 69 and a flow rate regulating valve 69a.

One end of the discharge pipe 69 is coupled to the feed pipe 67 between the low-pressure feed pump 76 and the high-pressure feed pump 77a. A flow rate regulating valve 69a is provided in the discharge pipe 69, and regulates a quantity of water to be discharged. Note that the other end of the discharge pipe 69 is opened to the outside, for example.

Of the condensed water pumped by the low-pressure feed pump 76, the water quantity equal to the water quantity resulting from the condensation of the water vapor produced by the combustor 75 is discharged to the outside via the discharge pipe 69.

Here, an action in the steam turbine system 70 will be explained.

The steam introduced to the high-pressure turbine 71 via the main steam pipe 60 rotationally moves the high-pressure turbine 71 to be thereafter discharged to the low-temperature reheat steam pipe 64. The steam discharged to the low-temperature reheat steam pipe 64 is guided to the reheat part 50. At this time, for example, the steam is introduced from the intermediate-pressure superheater 42a via the steam pipe 62 to the low-temperature reheat steam pipe 64.

The steam guided to the reheat part 50 via the low-temperature reheat steam pipe 64 is reheated, and guided to the high-temperature reheat steam pipe 65. Then, the steam is introduced to the combustor 75 via the high-temperature reheat steam pipe 65.

In the combustor 75, water vapor at high temperatures is produced by the combustion of hydrogen and oxygen. The water vapor produced by the combustor 75 is mixed with the steam introduced to the combustor 75 via the high-temperature reheat steam pipe 65 to become the steam to be introduced to the oxygen-hydrogen combustion turbine 72. A temperature of the steam introduced to the combustor 75 rises by being mixed with the water vapor produced by the combustor 75. That is, steam with a temperature exceeding a temperature of the steam reheated in the reheat part 50 is introduced to the oxygen-hydrogen combustion turbine 72 by including the combustor 75.

The steam introduced to the oxygen-hydrogen combustion turbine 72 rotationally moves the oxygen-hydrogen combustion turbine 72 to be thereafter introduced to the second heat recovery steam generator 80 via the steam pipe 102. The steam generated by the steam generation part 90 of the second heat recovery steam generator 80 is introduced to the low-pressure turbine 73 via the steam pipe 100. The steam introduced to the low-pressure turbine 73 rotationally moves the low-pressure turbine 73 to be thereafter discharged to the exhaust pipe 66.

Note that a state of the steam to be introduced to the oxygen-hydrogen combustion turbine 72 is regulated by setting of a supply heat quantity in the combustor 75, and the like. A state of the steam discharged from the oxygen-hydrogen combustion turbine 72 is regulated by setting of a configuration of the oxygen-hydrogen combustion turbine 72, the supply heat quantity in the combustor 75, and the like. A pressure and a temperature of the steam to be introduced to the low-pressure turbine 73 are regulated by a state of the steam to be introduced to the second heat recovery steam generator 80, a configuration of the steam generation part 90, and the like.

Here, the pressure of the steam to be introduced to the low-pressure turbine 73 via the steam pipe 100 is set to be higher than a pressure of the steam discharged from the oxygen-hydrogen combustion turbine 72. Note that states of steam from a steam inlet of the combustor 75 to the steam outlet of the low-pressure turbine 73 will be explained in detail later.

The steam discharged from the low-pressure superheater 43a is guided to a predetermined turbine stage of the low-pressure turbine 73 via the steam supply pipe 61. Moreover, the steam discharged from the second heat recovery steam generator 80 is guided to a predetermined turbine stage of the low-pressure turbine 73 via the steam pipe 101 and the steam supply pipe 61. A turbine output is increased by introducing the steam discharged from the low-pressure superheater 43a and the steam discharged from the second heat recovery steam generator 80 to the predetermined turbine stage.

The steam introduced to the low-pressure turbine 73 rotationally moves the low-pressure turbine 73 to be thereafter discharged to the discharge pipe 66. The steam discharged to the exhaust pipe 66 is introduced to the condenser 74, and changed into the condensed water.

The condensed water in the condenser 74 is pumped by the low-pressure feed pump 76 and the high-pressure feed pumps 77a, 77b, and guided to the high-pressure economizer 41e, the low-pressure economizer 43d, and the economizer 90d via the feed pipes 67, 67a, 67b, as previously described. Note that the water quantity equal to the water quantity resulting from the condensation of the water vapor produced by the combustor 75 in the condenser 74 is discharged via the discharge pipe 69.

Next, the states of the steam from the steam inlet of the combustor 75 to the steam outlet of the low-pressure turbine 73 will be explained.

Figure 2:
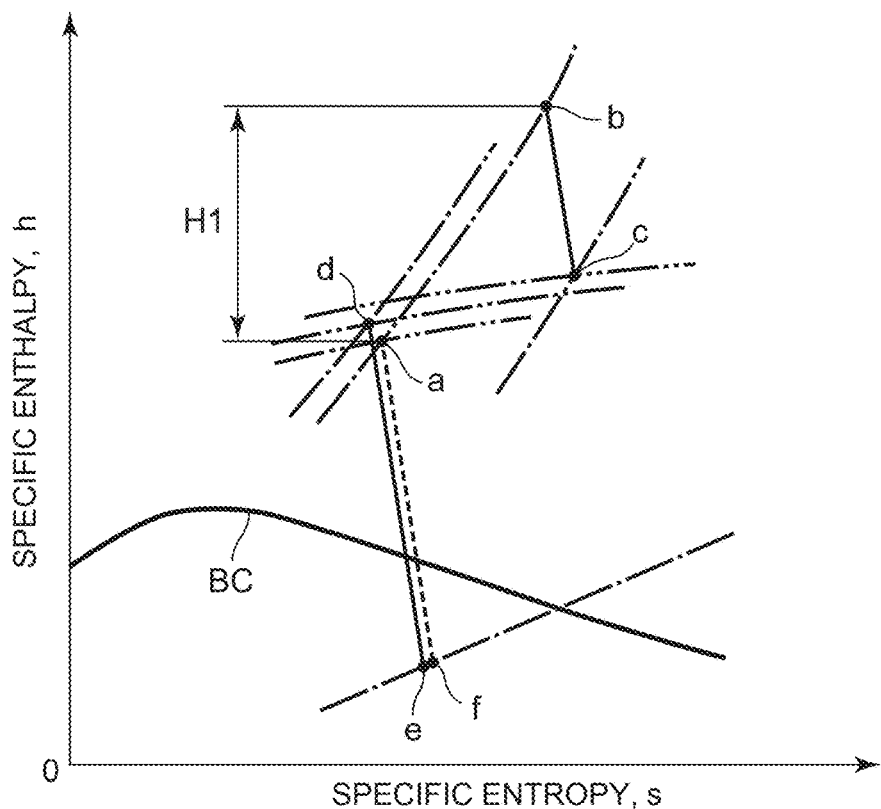
FIG. 2 is an h-s line graph illustrating a part of a heat cycle of the combined cycle power generation facility of the embodiment.

FIG. 2 is an h-s line graph illustrating a part of a heat cycle of the combined cycle power generation facility 1 of the embodiment. FIG. 2 illustrates the states of the steam from the steam inlet of the combustor 75 to the steam outlet of the low-pressure turbine 73.

In FIG. 2, a horizontal axis indicates a specific entropy s of steam (kJ/(kg·K)), and a vertical axis indicates a specific enthalpy h of steam (KJ/kg). Further, in FIG. 2, an isobar is indicated by a dot and dash line, and an isotherm is indicated by a two-dot chain line. Note that in FIG. 2, a saturation limit line is indicated by BC.

In FIG. 2, a state a is a state of the steam to be introduced to the combustor 75 via the high-temperature reheat steam pipe 65.

A state b is a state of the steam discharged from the combustor 75, in other words, the steam to be introduced to the steam inlet of the oxygen-hydrogen combustion turbine 72. Note that a temperature of the steam in the state b is higher than a temperature of the steam to be introduced to the high-pressure turbine 71. Further, the temperature of the steam in the state b can be made higher than a temperature of the exhaust gas to be introduced from the gas turbine 10 to the first heat recovery steam generator 30. In FIG. 2, a hydrogen supply heat quantity supplied in the combustor 75 is indicated by H1.

A state c is a state of steam at the steam outlet of the oxygen-hydrogen combustion turbine 72, in other words, a state of the steam to be introduced to the second heat recovery steam generator 80. A line connecting the state b and the state c is an expansion line in the oxygen-hydrogen combustion turbine 72.

A state d is a state of the steam to be introduced to the steam inlet of the low-pressure turbine 73 via the steam pipe 100. A state e is a state of the steam at the steam outlet of the low-pressure turbine 73, in other words, a state of the steam to be introduced to the condenser 74. A line connecting the state d and the state e is an expansion line in the low-pressure turbine 73. As illustrated in FIG. 2, the steam in the state e becomes wet steam.

Here, in FIG. 2, an expansion line (a line connecting the state a and a state f) in an intermediate-pressure turbine and a low-pressure turbine of a conventional combined cycle power generation facility is indicated by a dotted line.

The conventional combined cycle power generation facility is not provided with a combustor at the intermediate-pressure turbine. Further, the conventional combined cycle power generation facility is not provided with a second heat recovery steam generator either. Thus, steam reheated in the reheat part 50 is introduced to the intermediate-pressure turbine via a high-temperature reheat steam pipe. Then, steam discharged from the intermediate-pressure turbine is introduced to the low-pressure turbine.

Therefore, in the conventional combined cycle power generation facility, the state a is a state of steam to be introduced to a steam inlet of the intermediate-pressure turbine via the high-temperature reheat steam pipe. Further, the state f is a state of steam at a steam outlet of the low-pressure turbine.

As illustrated in FIG. 2, an enthalpy of the steam at the steam inlet of the oxygen-hydrogen combustion turbine 72 of this embodiment is higher than an enthalpy of the steam at the steam inlet of the intermediate-pressure turbine of the conventional combined cycle power generation facility by an enthalpy corresponding to a hydrogen supply heat quantity H1. Further, a pressure and an enthalpy of the steam at the steam outlet of the low-pressure turbine 73 of this embodiment drop to the same level as a pressure and an enthalpy of the steam at the steam outlet of the low-pressure turbine of the conventional combined cycle power generation facility.

As illustrated in FIG. 2, in the combined cycle power generation facility 1 of this embodiment, a pressure (a pressure in the state d) of the steam to be introduced to the steam inlet of the low-pressure turbine 73 is set to be higher than a pressure (a pressure in the state c) of the steam at the steam outlet of the oxygen-hydrogen combustion turbine 72. Thus, the expansion line in the low-pressure turbine 73 shifts to the left side on the h-s line graph in FIG. 2.

Further, as illustrated in FIG. 2, the enthalpy of the steam discharged from the low-pressure turbine 73 is maintained at about the same level as the enthalpy of the steam discharged from the conventional low-pressure turbine. That is, also in a case of increasing a temperature of the steam to be introduced to the oxygen-hydrogen combustion turbine 72, the enthalpy of the steam discharged from the low-pressure turbine 73 can be maintained at about the same level as the enthalpy of the steam discharged from the conventional low-pressure turbine.

This yields a large heat drop in the oxygen-hydrogen combustion turbine 72 and the low-pressure turbine 73. Thus, the hydrogen supply heat quantity H1 in the combustor 75 is converted effectively to motive power to improve thermal efficiency.

Further, the steam in the state e can be changed into wet steam by setting the pressure in the state d to be higher than the pressure in the state c. This allows the temperature of the steam at the steam inlet of the oxygen-hydrogen combustion turbine 72 to be increased while using the existing low-pressure turbine 73 designed so that stator blades and rotor blades in turbine stages in downstream stages handle wet steam.

Figure 3:
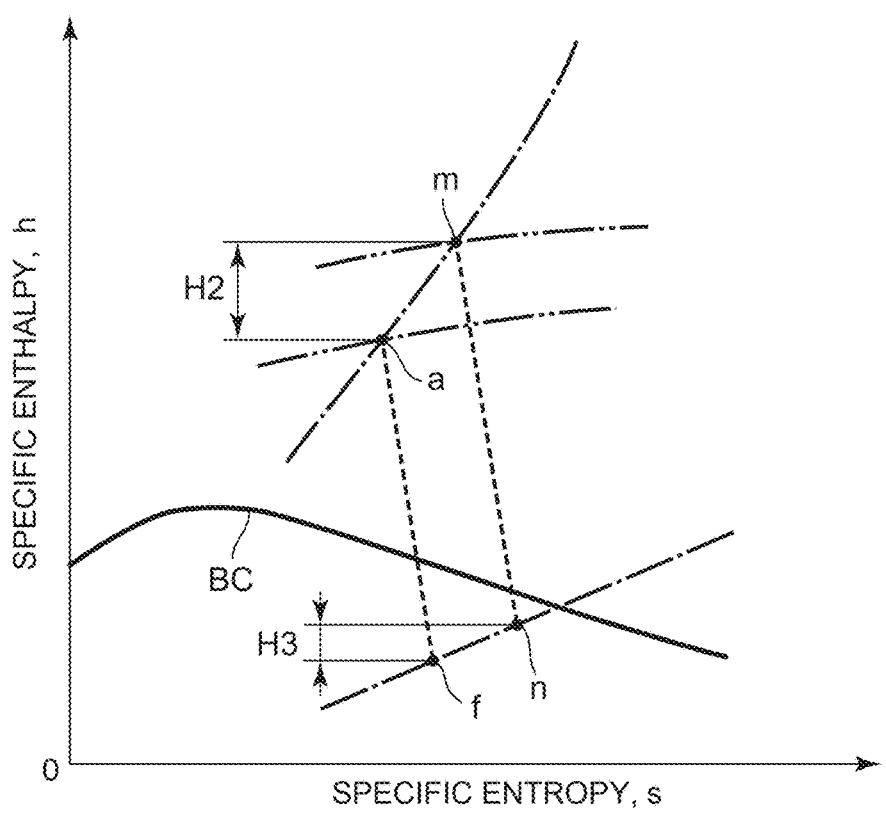
FIG. 3 is an h-s line graph illustrating a part of a heat cycle of a combined cycle power generation facility of a comparative example.

Here, FIG. 3 is an h-s line graph illustrating a part of a heat cycle of a combined cycle power generation facility of a comparative example.

The combined cycle power generation facility of the comparative example is presumed to be provided with a combustor at the steam inlet of the intermediate-pressure turbine of the conventional combined cycle power generation facility. Note that a configuration of the combustor provided at the intermediate-pressure turbine is the same configuration as the combustor 75 of this embodiment.

Incidentally, the comparative example is indicated for comparison with this embodiment, and is not included in this embodiment.

Here, in the conventional combined cycle power generation facility, steam from a heat recovery steam generator is introduced to a high-pressure turbine. Steam discharged from the high-pressure turbine is reheated by a reheat part in the heat recovery steam generator, and introduced to the intermediate-pressure turbine. Steam discharged from the intermediate-pressure turbine is introduced to the low-pressure turbine.

The combined cycle power generation facility of the comparative example is presumed to be provided with the combustor at the steam inlet of the intermediate-pressure turbine in this conventional combined cycle power generation facility. Thus, in the combined cycle power generation facility of the comparative example, steam discharged from a high-pressure turbine is reheated by a reheat part in a heat recovery steam generator, and introduced to the combustor via a high-temperature reheat steam pipe. Steam discharged from the combustor is introduced to the intermediate-pressure turbine. Steam discharged from the intermediate-pressure turbine is introduced to a low-pressure turbine. The combined cycle power generation facility of the comparative example does not include the second heat recovery steam generator 80 which the combined cycle power generation facility 1 of this embodiment includes.

FIG. 3 illustrates states of steam from a steam inlet of the combustor to a steam outlet of the low-pressure turbine.

In FIG. 3, a state a is a state of the steam to be introduced to the combustor via the high-temperature reheat steam pipe. Note that a state f is the state of the steam at the steam outlet of the low-pressure turbine of the conventional combined cycle power generation facility which is not provided with the combustor at the intermediate-pressure turbine as explained with reference to FIG. 2.

A state m is a state of the steam discharged from the combustor, in other words, the steam to be introduced to the steam inlet of the intermediate-pressure turbine. In FIG. 3, a hydrogen supply heat quantity supplied in the combustor is indicated by H2.

A state n is a state of steam at the steam outlet of the low-pressure turbine, in other words, a state of steam to be introduced to a condenser. A line connecting the state m and the state n is an expansion line in the intermediate-pressure turbine and the low-pressure turbine.

In FIG. 3, H3 indicates an enthalpy increase in the steam discharged from the low-pressure turbine with increasing a temperature of the steam to be introduced to the steam inlet of the intermediate-pressure turbine. That is, the enthalpy increase H3 is a difference between an enthalpy of the steam discharged from the low-pressure turbine in a case of including the combustor and an enthalpy of the steam discharged from the low-pressure turbine in a case of not including the combustor.

As described above, in the comparative example, the expansion line in the intermediate-pressure turbine and the low-pressure turbine shifts from a line connecting the state a and the state f to the line connecting the state m and the state n by including the combustor. Here, the hydrogen supply heat quantity H2 is regulated so that the steam in the state n becomes wet steam.

In the comparative example illustrated in FIG. 3, an increase ΔH of a heat drop in the intermediate-pressure turbine and the low-pressure turbine caused by including the combustor is H2-H3. As illustrated in FIG. 3, in the comparative example, even though the combustor is included, the increase ΔH of the heat drop with respect to the hydrogen supply heat quantity H2 is small. This tendency is the same also in a case of further increasing the hydrogen supply heat quantity H2. Note that the enthalpy in the state n is reduced to an enthalpy at which the wet steam is obtained, and thus the hydrogen supply heat quantity H2 is limited.

Thus, in the comparative example of not including the second heat recovery steam generator 80, even though the combustor is included, improvement in sufficient thermal efficiency cannot be expected.

In contrast to this, according to the combined cycle power generation facility 1 of the embodiment, the pressure of the steam to be introduced to the low-pressure turbine 73 can be made higher than the pressure of the steam exhausted from the oxygen-hydrogen combustion turbine 72 while increasing the temperature of the steam to be introduced to the oxygen-hydrogen combustion turbine 72 by including the combustor 75 and the second heat recovery steam generator 80.

This yields a large heat drop in the heat cycle, and leads to effective use of the hydrogen supply heat quantity H1 in the combustor 75 to improve the thermal efficiency. Further, the steam discharged from the low-pressure turbine 73 can be changed into the wet steam to enable the use of the existing low-pressure turbine as the low-pressure turbine 73.

According to the embodiment explained above, the temperature of the steam to be introduced to the steam turbine can be increased, and the large heat drop can be obtained in the heat cycle to enable the improvement in the thermal efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A combined cycle power generation facility comprising:
   a gas turbine;
   a first heat recovery steam generator including a first steam generation part which uses a heat quantity of an exhaust gas from the gas turbine to generate steam, and a reheat part which reheats steam;
   a first steam turbine to which the steam generated by the first steam generation part is introduced;
   a combustor which combusts hydrogen and oxygen;
   a reheat steam pipe connecting a steam outlet of the first steam turbine and the combustor with the reheat part interposed therebetween;
   a second steam turbine which is coupled to the combustor and to which steam discharged from the combustor is introduced;
   a second heat recovery steam generator including a second steam generation part which uses a heat quantity of steam discharged from the second steam turbine to generate steam;
   a third steam turbine to which the steam generated by the second steam generation part is introduced; and
   a condenser which changes steam discharged from the third steam turbine into condensed water.

2. The combined cycle power generation facility according to claim 1, wherein a pressure of the steam to be introduced to the third steam turbine is higher than a pressure of the steam discharged from the second steam turbine.

3. The combined cycle power generation facility according to claim 1, wherein steam discharged from the second heat recovery steam generator is introduced to a predetermined turbine stage of the third steam turbine.

4. The combined cycle power generation facility according to claim 1, wherein:
the first heat recovery steam generator comprises
a third steam generation part which generates steam with a pressure lower than a pressure of the steam generated by the first steam generation part; and
the steam generated by the third steam generation part is introduced to a predetermined turbine stage of the third steam turbine.

5. The combined cycle power generation facility according to claim 1, further comprising
a condensed water supply system which supplies condensed water produced by the condenser to the first heat recovery steam generator and the second heat recovery steam generator.

6. The combined cycle power generation facility according to claim 1, further comprising
a condensed water discharge system for removing a water quantity equal to the water quantity resulting from condensation of water vapor produced by the combustor from condensed water produced by the condenser.

* * * * *